(12) United States Patent
Vendik et al.

(10) Patent No.: US 9,508,488 B2
(45) Date of Patent: Nov. 29, 2016

(54) RESONANT APPARATUS FOR WIRELESS POWER TRANSFER

(71) Applicant: SAMSUNG ELECTRONICS CO., LTD., Suwon-si (KR)

(72) Inventors: Orest Genrihovich Vendik, St. Petersburg (RU); Irina Borisovna Vendik, St. Petersburg (RU); Dmitry Victorovich Kholodnyak, St. Petersburg (RU); Pavel Anatolevich Turalchuk, Vsevolozhsk (RU); Dmitry Sergeevich Kozlov, St. Petersburg (RU); Evgenia Yurevna Zameshaeva, St. Petersburg (RU); Ki Young Kim, Yongin-si (KR); Nikolay Nikolaevich Olyunin, Perm (RU)

(73) Assignee: Samsung Electronics Co., Ltd., Suwon-si (KR)

(*) Notice: Subject to any disclaimer, the term of this patent is extended or adjusted under 35 U.S.C. 154(b) by 658 days.

(21) Appl. No.: 13/738,064

(22) Filed: Jan. 10, 2013

(65) Prior Publication Data

US 2013/0187475 A1   Jul. 25, 2013

(30) Foreign Application Priority Data

Jan. 10, 2012   (RU) ............................. 2012100029
Jan. 10, 2013   (KR) ....................... 10-2013-0002905

(51) Int. Cl.

| H01F 38/14 | (2006.01) |
|---|---|
| H02J 5/00 | (2016.01) |
| H02J 17/00 | (2006.01) |
| H04B 5/00 | (2006.01) |

(52) U.S. Cl.
CPC .............. *H01F 38/14* (2013.01); *H02J 5/005* (2013.01); *H02J 17/00* (2013.01); *H04B 5/0037* (2013.01); *H04B 5/0031* (2013.01); *H04B 5/0081* (2013.01)

(58) Field of Classification Search
CPC ......... H01F 38/14; H02J 17/00; H02J 5/005; H04B 5/0031; H04B 5/0037; H04B 5/0081

USPC ........................................................ 307/104
See application file for complete search history.

(56) References Cited

U.S. PATENT DOCUMENTS

| 2004/0257171 A1* | 12/2004 | Park | H03H 3/02 333/133 |
|---|---|---|---|
| 2005/0012570 A1* | 1/2005 | Korden | H03H 9/0095 333/189 |
| 2006/0164186 A1* | 7/2006 | Stoemmer | H03H 9/0542 333/189 |
| 2008/0129414 A1* | 6/2008 | Lobl | H03H 3/04 333/187 |
| 2009/0218912 A1* | 9/2009 | Abd Allah | H03H 9/174 310/321 |
| 2009/0267453 A1* | 10/2009 | Barber | H03H 3/02 310/322 |
| 2010/0289380 A1* | 11/2010 | Ballandras | H03H 9/02535 310/313 D |
| 2010/0327995 A1* | 12/2010 | Reinhardt | H03H 3/04 333/195 |
| 2011/0037536 A1* | 2/2011 | Kanno | H01G 4/005 333/185 |
| 2011/0140809 A1* | 6/2011 | Ryu | H01P 7/082 333/219 |
| 2011/0163827 A1* | 7/2011 | Kanno | H01G 4/255 333/185 |
| 2011/0266917 A1* | 11/2011 | Metzger | H03H 3/02 310/313 A |

* cited by examiner

*Primary Examiner* — Thienvu Tran
*Assistant Examiner* — David M Stables
(74) *Attorney, Agent, or Firm* — NSIP Law

(57) ABSTRACT

Provided is a bulk acoustic resonator (BAR)-based resonant structure in relation to electric and radio technologies, and more particularly, to a wireless power transmission system. A resonant apparatus for wireless power transmission may include a conducting loop, and a high quality capacitor. The high quality capacitor may include a metacapacitor including a thin piezoelectric layer disposed between two metal electrodes. The metacapacitor may be disposed between two dielectric layers of which central portions are etched, and the conducting loop may be disposed on an upper layer of the two dielectric layers.

20 Claims, 5 Drawing Sheets

RESONANT APPARATUS FOR WIRELESS POWER TRANSFER

CROSS-REFERENCE TO RELATED APPLICATIONS

This application claims the benefit under 35 U.S.C. §119 (a) of Russian Patent Application No. 2012100029, filed on Jan. 10, 2012 and Korean Patent Application No. 10-2013-0002905, filed on Jan. 10, 2013, the entire disclosures of which are incorporated herein by reference for all purposes.

BACKGROUND

1. Field

The following description relates to electric and radio technologies, and more particularly, to a wireless power transmission system.

2. Description of Related Art

Various solutions in the field of power transmission via radio waves have been suggested for transferring power wireless. The basic ideas of wireless power transfer were first suggested by Nikola Tesla.

A device known as a "rectenna" may be used for wireless transmission of energy. The rectenna refers to a rectifying antenna that may be used for direct conversion of microwave energy into direct current (DC) electricity. Different types of antennas may be used for receiving radio frequency (RF) signals.

In another approach to wireless power transfer, two separate coils with identical resonant frequencies may be used to form a resonant system based on magnetic coupling and may exchange energy at a high efficiency, while an interaction with other off-resonant objects may be relatively weak. The system may be operated in a megahertz (MHz) frequency range, and may be used in everyday life.

SUMMARY

In one general aspect, there is provided a resonant apparatus for wireless power transmission. The resonant apparatus may include a conducting loop and a high quality capacitor.

The high quality capacitor may include a metacapacitor including a thin piezoelectric layer disposed between two metal electrodes. The metacapacitor may be disposed between two dielectric layers of which central portions are etched. The conducting loop may be disposed on an upper layer of the two dielectric layers.

Other features and aspects will be apparent from the following detailed description, the drawings, and the claims.

Figure 1:
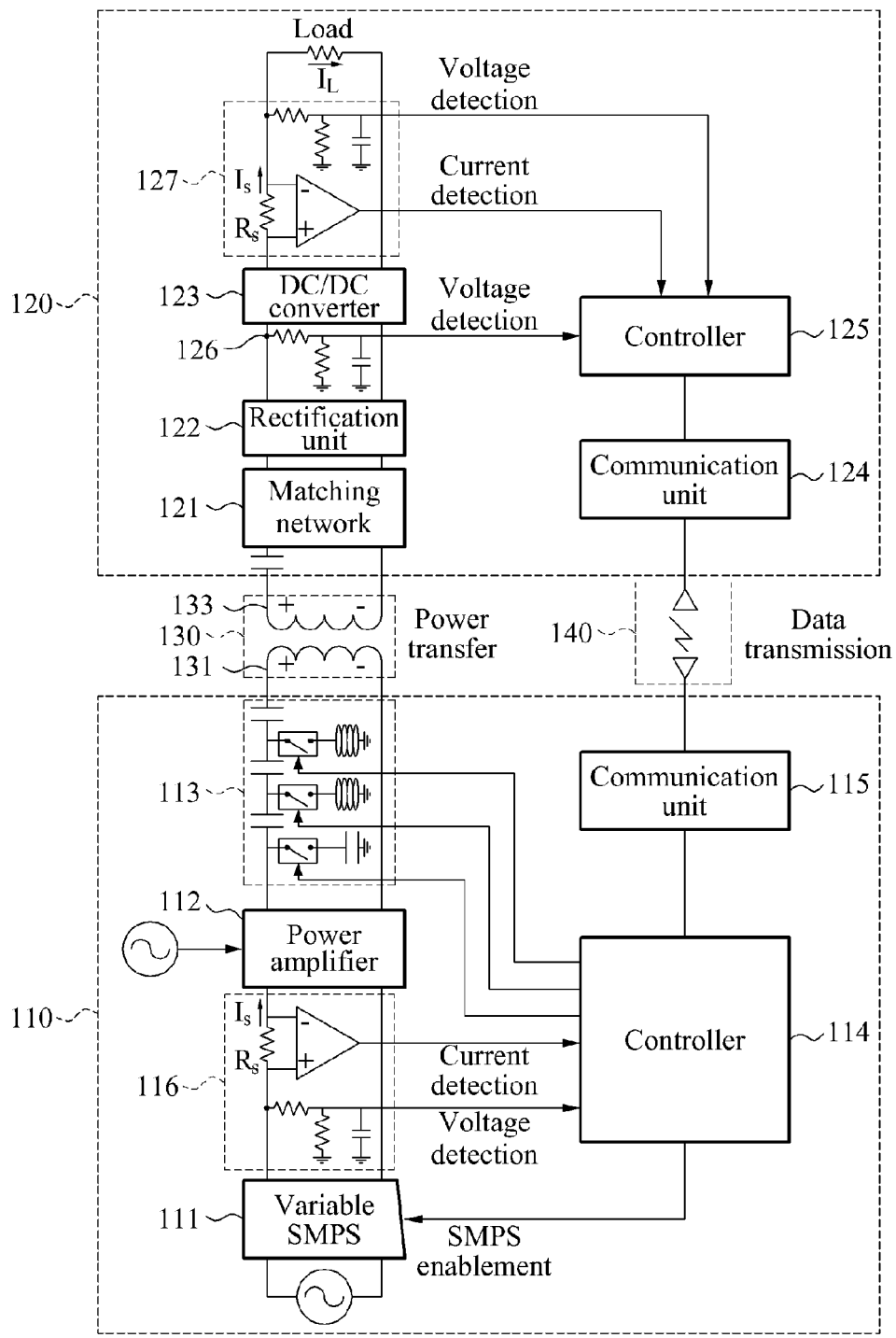
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission system.

Referring to FIG. 1, the wireless transmission system includes a source 110 and a target 120. The source 110 may be a device to supply wireless power, for example a pad, a terminal, a television (TV), and the like. The target 120 may refer to a device configured to receive wireless power, for example, a terminal, a TV, a washing machine, a radio, a electric light, and the like.

In the example of FIG. 1, the source 110 includes a variable switching mode power supply (SMPS) 111, a power amplifier 112, a matching network 113, a controller 114, and a communication unit 115.

The variable SMPS 111 may generate direct current (DC) voltage by switching alternating current (AC) voltage, for example, in a band of tens of hertz (Hz) output from the power amplifier 112. The variable SMPS 111 may output DC voltage of a predetermined level. In some examples, the variable SMPS 111 may adjust an output level of DC voltage based on the control of the controller 114.

Referring to FIG. 1, the source 110 further includes a power detector 116. The power detector 116 may detect output current and output voltage of the variable SMPS 111, and may transfer, to the controller 114, information on the detected current and the detected voltage. Additionally, the power detector 116 may detect input current and input voltage of the power amplifier 112.

The power amplifier 112 may generate power by converting DC voltage of a predetermined level to AC voltage, using a switching pulse signal, for example, in a band of a few megahertz (MHz) to tens of MHz. Accordingly, the power amplifier 112 may convert DC voltage supplied to the power amplifier 112 to AC voltage, using a reference resonant frequency $F_{Ref}$. In doing so, the power amplifier 112 may generate, for example, communication power used for communication, charging power used for charging, and the like. The communication power and the charging power may be used in a plurality of target devices.

For example, the communication power may refer to low power of 0.1 milliwatt (mW) to 1 mW. For example, the charging power may refer to high power of 1 mW to 200 W that is consumed in a device load of a target device. In various examples described herein, the term "charging" may refer to supplying power to a unit or element that is configured to charge power. Additionally, the term "charging" may refer to supplying power to a unit or element that is configured to consume power. The units or elements may include, for example, batteries, displays, sound output circuits, main processors, various sensors, and the like.

According to various examples, the term "reference resonant frequency" may refer to a resonant frequency that is used by the source 110. Additionally, the term "tracking frequency" may refer to a resonant frequency that is adjusted by a preset scheme.

The controller 114 may detect a reflected wave of the communication power or the charging power, and may detect mismatching that occurs between a target resonator 133 of the target 120 and a source resonator 131 of the source 110 based on the detected reflected wave. To detect the mismatching, for example, the controller 114 may detect an envelope of the reflected wave, a power amount of the reflected wave, and the like.

The matching network 113 may compensate for impedance mismatching between the source resonator 131 and the target resonator 133 to be optimal matching, under the control of the controller 114. For example, the matching network 113 may be connected through a switch, based on a combination of a capacitor and an inductor, under the control of the controller 114.

The controller 114 may compute a voltage standing wave ratio (VSWR), for example, based on a voltage level of the reflected wave, and based on a level of an output voltage of the source resonator 131 or the power amplifier 112. For example, if the VSWR is greater than a predetermined value, the controller 114 may determine that mismatching is detected.

For example, the controller 114 may compute a power transmission efficiency for each of N tracking frequencies, may determine a tracking frequency $F_{Best}$ with the best power transmission efficiency among the N tracking frequencies, and may adjust the reference resonant frequency $F_{Ref}$ to the tracking frequency $F_{Best}$. In various examples, the N tracking frequencies may be set in advance.

The controller 114 may adjust a frequency of a switching pulse signal. Under the control of the controller 114, the frequency of the switching pulse signal may be determined. For example, by controlling the power amplifier 112, the controller 114 may generate a modulation signal to be transmitted to the target 120. In some examples, the communication unit 115 may transmit a variety of data 140, including the modulation signal, to the target 120 using in-band communication. The controller 114 may detect a reflected wave, and may demodulate a signal received from the target 120 through an envelope of the detected reflected wave.

The controller 114 may generate a modulation signal for in-band communication, using various ways. For example, the controller 114 may generate the modulation signal by turning on or off a switching pulse signal, by performing delta-sigma modulation, and the like. As another example, the controller 114 may generate a pulse-width modulation (PWM) signal with a predetermined envelope.

The communication unit 115 may perform out-band communication using a communication channel. For example, the communication unit 115 may include a communication module, such as one configured to process ZigBee, Bluetooth, and the like. The communication unit 115 may transmit the data 140 to the target 120 through the out-band communication.

The source resonator 131 may transfer an electromagnetic energy 130 to the target resonator 133. For example, the source resonator 131 may transfer the communication power or charging power to the target 120, using magnetic coupling with the target resonator 133.

As illustrated in FIG. 1, the target 120 includes a matching network 121, a rectification unit 122, a DC/DC converter 123, a communication unit 124, and a controller 125.

The target resonator 133 may receive the electromagnetic energy 130 from the source resonator 131. For example, the target resonator 133 may receive the communication power or charging power from the source 110, using the magnetic coupling with the source resonator 131. Additionally, the target resonator 133 may receive the data 140 from the source 110 using the in-band communication.

The matching network 121 may match an input impedance viewed from the source 110 to an output impedance viewed from a load. As an example, the matching network 121 may include a combination of a capacitor and an inductor.

The rectification unit 122 may generate DC voltage by rectifying AC voltage. The AC voltage may be received from the target resonator 133.

The DC/DC converter 123 may adjust a level of the DC voltage that is output from the rectification unit 122, based on a capacity to be used by the load. As merely an example, the DC/DC converter 123 may adjust the level of the DC voltage output from the rectification unit 122 from 3 volts (V) to 10 V.

In this example, the target 120 further includes a power detector 127. The power detector 127 may detect voltage of an input terminal 126 of the DC/DC converter 123, and current and voltage of an output terminal of the DC/DC converter 123. The detected voltage of the input terminal 126 may be used to compute a transmission efficiency of power received from the source 110. Additionally, the detected current and the detected voltage of the output terminal may be used by the controller 125 to compute an amount of power transferred to the load. The controller 114 of the source 110 may determine an amount of power that is to be transmitted by the source 110, based on power that is to be used by the load and power transferred to the load.

When power of the output terminal computed using the controller 125 is transferred to the source 110 using the communication unit 124, the source 110 may compute an amount of power that is to be transmitted.

The communication unit 124 may perform in-band communication to transmit or receive data using a resonance frequency. During the in-band communication, the controller 125 may demodulate a received signal by detecting a signal between the target resonator 133 and the rectification unit 122, or detecting an output signal of the rectification unit 122. In other words, the controller 125 may demodulate a message received using the in-band communication. Additionally, the controller 125 may adjust an impedance of the target resonator 133 using the matching network 121, to modulate a signal to be transmitted to the source 110. For example, the controller 125 may increase the impedance of the target resonator 133, so that a reflected wave may be detected from the controller 114 of the source 110. Depending on whether the reflected wave is detected, for example, the controller 114 may detect a binary number such as "0" or "1."

The communication unit 124 may transmit a response message to the communication unit 115 of the source 110. For example, the response message may include a "type of a corresponding target," "information about a manufacturer of a corresponding target," "a model name of a corresponding target," a "battery type of a corresponding target," a "scheme of charging a corresponding target," an "impedance value of a load of a corresponding target," "information on characteristics of a target resonator of a corresponding target," "information on a frequency band used by a corresponding target," an "amount of a power consumed by a corresponding target," an "identifier (ID) of a corresponding target," "information on version or standard of a corresponding target," and the like.

The communication unit 124 may perform out-band communication using a communication channel. For example, the communication unit 124 may include a communication module, such as one configured to process ZigBee, Bluetooth, and the like. The communication unit 124 may transmit or receive the data 140 to or from the source 110 using the out-band communication.

The communication unit 124 may receive a wake-up request message from the source 110, and the power detector 127 may detect an amount of power received to the target resonator 133. The communication unit 124 may transmit, to the source 110, information on the detected amount of the power. Information on the detected amount may include, for example, an input voltage value and an input current value of the rectification unit 122, an output voltage value and an output current value of the rectification unit 122, an output voltage value and an output current value of the DC/DC converter 123, and the like.

In FIG. 1, the controller 114 may set a resonance bandwidth of the source resonator 131. Based on the set resonance bandwidth of the source resonator 131, a Q-factor (Qs) of the source resonator 131 may be determined.

The controller 125 may set a resonance bandwidth of the target resonator 133. Based on the set resonance bandwidth of the target resonator 133, a Q-factor of the target resonator 133 may be determined. In this instance, the resonance bandwidth of the source resonator 131 may be wider or narrower than the resonance bandwidth of the target resonator 133.

Via a communication, the source 110 and the target 120 may share information about each of the resonance bandwidths of the source resonator 131 and the target resonator 133. For example, if a power higher than a reference value is requested from the target 120, the Q-factor (Qs) of the source resonator 131 may be set to a value greater than 100. As another example, if a power lower than the reference value is requested from the target 120, the Q-factor (Qs) of the source resonator 131 may be set to a value less than 100.

In a resonance-based wireless power transmission, a resonance bandwidth may be a factor. When Qt indicates a Q-factor based on a change in a distance between the source resonator 131 and the target resonator 133, a change in a resonance impedance, impedance-mismatching, a reflected signal, and the like, Qt may be in inverse proportion to a resonance bandwidth, as given in Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between resonators, $BW_S$ denotes a resonance bandwidth of the source resonator 131, and $BW_D$ denotes a resonance bandwidth of the target resonator 133.

In a wireless power transmission, an efficiency U of the wireless power transmission may be given by Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad \text{[Equation 2]}$$

In Equation 2, $\kappa$ denotes a coupling coefficient regarding energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor regarding energy coupling between the source resonator 131 and the target resonator 133.

Referring to Equation 2, the Q-factor may be associated with an efficiency of the wireless power transmission. Accordingly, the Q-factor may be set to a large value in order to increase the efficiency of the wireless power transmission. For example, when $Q_S$ and $Q_D$ are respectively set to a significantly large value, the efficiency of the wireless power transmission may be reduced based on a change in the coupling coefficient K regarding the energy coupling, a change in a distance between the source resonator 131 and the target resonator 133, a change in a resonance impedance, impedance mismatching, and the like.

When each of the resonance bandwidths of the source resonator 131 and the target resonator 133 is set to be too narrow in order to increase the efficiency of the wireless power transmission, the impedance mismatching and the like may easily occur due to insignificant external influences. In consideration of the impedance mismatching, Equation 1 may be expressed by Equation 3.

$$\frac{\Delta f}{f_0} = \frac{\sqrt{VSWR} - 1}{Qt\sqrt{VSWR}} \qquad \text{[Equation 3]}$$

In FIG. 1, the source 110 may transmit a wake-up power wirelessly, to be used to wake up the target 120. The source 110 may broadcast a configuration signal to configure a wireless power transmission network. The source 110 may receive a search frame including a receiving sensitivity value of the configuration signal from the target 120. The source 110 may allow the target 120 to join the wireless power transmission network. For example, the source 110 may transmit an identifier to the target 120 to identify the target 120 in the wireless power transmission network. The source 110 may generate charging power through a power control, and transmit the charging power to the target wirelessly.

In addition, the target 120 may receive wake-up power from at least one of a plurality of source devices. The target 120 may activate a communication function using the wake-up power. The target 120 may receive a configuration signal to configure a wireless power transmission network of each of the plurality of source devices. As an example, the target 120 may select the source 110 based on a receiving sensitivity of the configuration signal, and receive power from the selected source 110 wirelessly.

A resonant apparatus for wireless power transmission may be configured in a compact size, and may have a high Q-factor while being operated at a frequency ranging, for example, from 1 MHz to 100 MHz. Such a technical result may be implemented by a resonant structure including a conducting loop and a high quality capacitor.

According to various aspects, the high quality capacitor may be operated as a metacapacitor including a thin piezoelectric layer disposed between two metallic electrodes. For example, the metacapacitor may be disposed between two dielectric layers. In addition, central portions of the dielectric layers may be etched. The conducting loop may be fixed onto an upper layer of the two dielectric layers.

The conducting loop may be operated as a planar conductor in which a thickness of the conductor is less than a width of the conductor.

The central portions of the dielectric layers may be etched to provide a free space for an acoustic oscillation of a resonator membrane.

A thickness of the upper layer of the dielectric layers may be determined to minimize or reduce an impact of a parasitic capacitance between the conducting loop and an upper electrode of the metacapacitor. A thickness of a lower layer of the dielectric layers may be determined to ensure a mechanical strength of the resonant apparatus.

The dielectric layers may be made of silicon dioxide.

The conducting loop may be connected to an upper electrode and a lower electrode of the metacapacitor by metalized via holes or external connectors.

The piezoelectric layer of the metacapacitor may be made of a ceramic material with a piezoelectric effect.

The piezoelectric layer of the metacapacitor may be made of a mono-crystalline material having a high electromechanical coupling coefficient, a high Q-factor, and a low dielectric loss.

The piezoelectric layer of the metacapacitor may be made of plumbum titanate-zirconate ($Pb(Zr_xTi_{1-x})O_3$ (PZT)).

The resonant apparatus may have a planar multilayer structure made by a thin film technology.

As another example, the resonant apparatus may have a circular structure or a polygonal structure including a predetermined number of faces.

A diameter of the resonant apparatus may be smaller than a hundredth of a wavelength $\lambda$, for example, $\lambda/100$.

The resonant apparatus may be designed to be operated at a frequency ranging, for example, from 1 MHz to 100 MHz.

A thickness of the piezoelectric layer may be determined to be a thickness by which an acoustic oscillation of a shear wave resonates at a predetermined frequency. For example, the predetermined frequency may be higher than a system operating frequency.

The metacapacitor may be operated as an acoustic resonator, and an external impedance at a system operating frequency of the acoustic resonator may be equivalent to an impedance of a capacitor having a high capacitance value.

A high capacitance value of the metacapacitor may be determined to ensure a resonant response of the resonant apparatus at a selected system operating frequency, in combination with a low inductance of the conducting loop.

Figure 2:
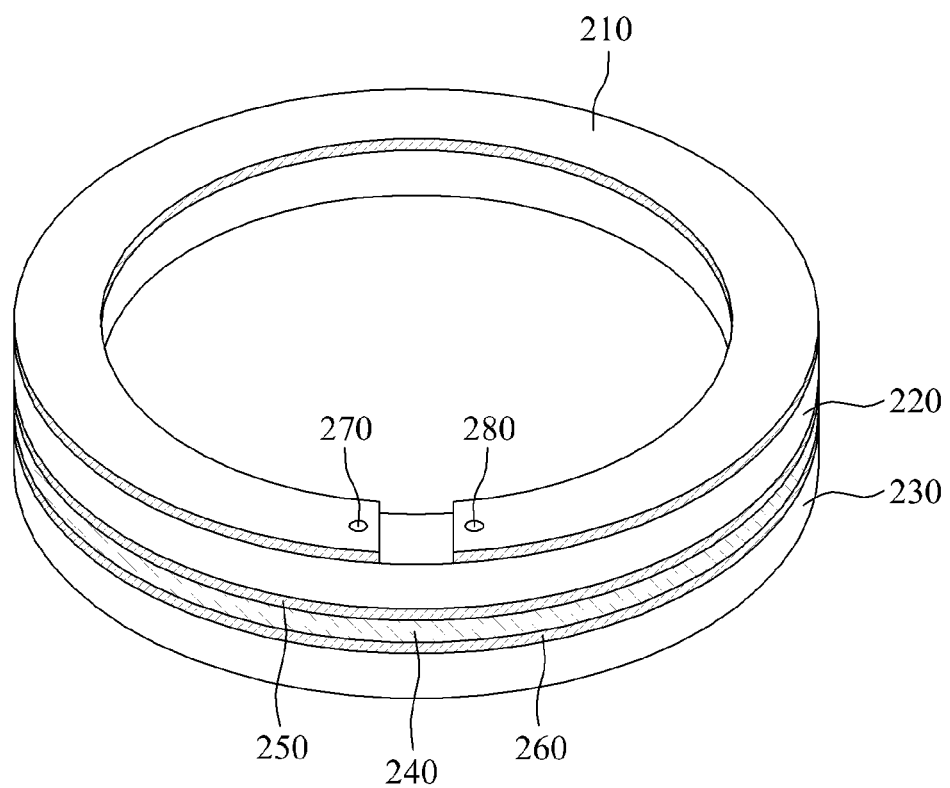
FIG. 2 is a diagram illustrating an example of a structure including a metacapacitor and a conducting loop of a resonant apparatus for wireless power transmission.

FIG. 2 illustrates an example of a structure including a metacapacitor and a conducting loop of a resonant apparatus for wireless power transmission.

Referring to FIG. 2, a resonant structure including a metacapacitor may include a planar multilayer structure including a conducting loop 210 corresponding to a single layer, and a metacapacitor including multiple layers, for example, a piezoelectric layer 240, an upper electrode 250, and a lower electrode 260.

The metacapacitor may be operated as a bulk acoustic resonator (BAR) at an operating frequency. For example, an external impedance of the BAR may be equivalent to an impedance of a capacitor having a high capacitance value.

The metacapacitor includes the upper electrode 250, the lower electrode 260, and the piezoelectric layer 240 made of a piezoelectric material. The piezoelectric layer 240 may be disposed between the upper electrode 250 and the lower electrode 260. The upper electrode 250 and the lower electrode 260 may be made of a metallic material. For example, the upper electrode 250 and the lower electrode 260 may be made of a thin metal film covering a top surface and a bottom surface of the piezoelectric layer 240.

For example, the piezoelectric layer 240 may be made of a ceramic material having a piezoelectric effect. As another example, the piezoelectric layer 240 may be made of a mono-crystalline material, for example, $Pb(Zr_xTi_{1-x})O_3$, having a high electromechanical coupling coefficient, a high Q-factor, and a low dielectric loss factor.

The conducting loop 210 may include a planar conductor in which a thickness of the conductor is less than a width of the conductor. The conducting loop 210 may be disposed on the upper electrode 250 of the metacapacitor. An upper layer 220 of dielectric layers, which comprise upper layer 220 and lower layer 230, may be disposed between the conducting loop 210 and the upper electrode 250.

A thickness of the upper layer 220 may be determined to minimize or reduce an impact of a parasitic capacitance between the conducting loop 210 and the upper electrode 250 of the metacapacitor, in an aspect of device efficiency.

The metacapacitor may be mounted on the lower layer 230. For example, the lower layer 230 may be made of a silicon material. A thickness of the lower layer 230 may be determined based on a mechanical strength of the structure.

The conducting loop 210 may be connected to the upper electrode 250 and the lower electrode 260 of the metacapacitor by metalized via holes 270 and 280.

For example, the upper layer 220 and the lower layer 230 may be made of silicon dioxide.

A central portion of the upper layer 220 disposed on a top surface of the metacapacitor and a central portion of the lower layer 230 disposed on a bottom surface of the metacapacitor may be etched. The central portions may be etched to provide free acoustic boundary conditions, for example, a free space for an acoustic oscillation of a membrane.

Here, the metacapacitor may provide a shear wave resonance of a bulk acoustic wave having a high Q-factor generated between the upper electrode 250 and the lower electrode 260.

An acoustic resonance of the metacapacitor may occur at a frequency exceeding a requested system operating frequency.

An equivalent input impedance of the metacapacitor at the system operating frequency may exhibit a capacitive feature corresponding to a capacitor having a high capacitance.

For example, the high capacitance of the metacapacitor combined with a low inductance of the conducting loop 210 may provide a resonant response of the resonant apparatus at a preset frequency within a MHz frequency range.

For example, the resonant apparatus may have a size that is smaller than a hundredth of a wavelength λ, for example, λ/100. For example, the resonant apparatus may be operated at a frequency ranging from 1 MHz to 100 MHz.

Figure 3:
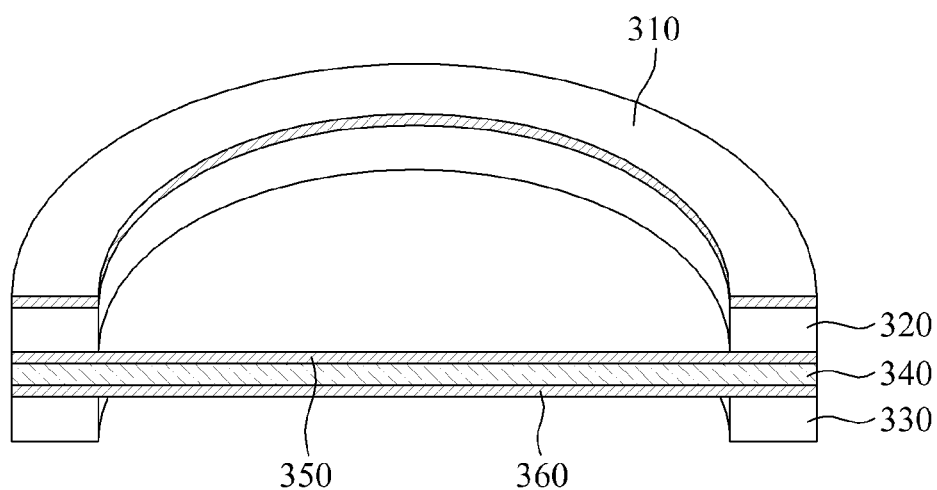
FIG. 3 is a diagram illustrating an example of a structure including a metacapacitor and a conducting loop of a resonant apparatus for wireless power transmission.

FIG. 3 illustrates an example of a structure including a metacapacitor and a conducting loop of a resonant apparatus for wireless power transmission.

Referring to FIG. 3, the resonant apparatus includes a conducting loop 310 corresponding to a single layer, and a metacapacitor including multiple layers, for example, a piezoelectric layer 340, an upper electrode 350, and a lower electrode 360. The resonant apparatus may further include an upper layer 320, and a lower layer 330 made of a dielectric material.

The resonant apparatus may have a structure including the conducting loop 310, and the upper layer 320 and the lower layer 330 of which central portions are etched.

Figure 4:
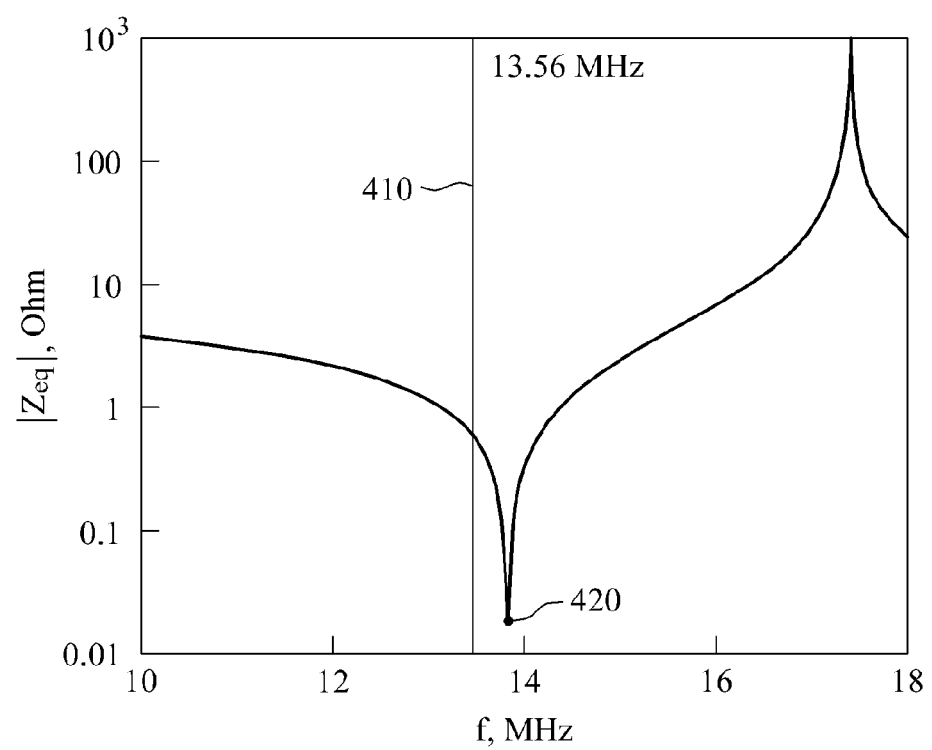
FIG. 4 is a graph illustrating an example of a frequency dependence of an equivalent input impedance of a metacapacitor in a resonant apparatus for wireless power transmission.

FIG. 4 illustrates an example of a graph of frequency dependence of an equivalent input impedance of a metacapacitor in a resonant apparatus for wireless power transmission.

Referring to FIG. 4, a thickness of a piezoelectric layer may be determined to provide a resonance of a shear wave oscillation at a predetermined frequency 420 set to be higher than a system operating frequency 410.

An impedance of the metacapacitor at the predetermined frequency 420 set to be higher than the operating frequency 410 may have a capacitive feature corresponding to a capacitor having a high capacitance.

Figure 5:
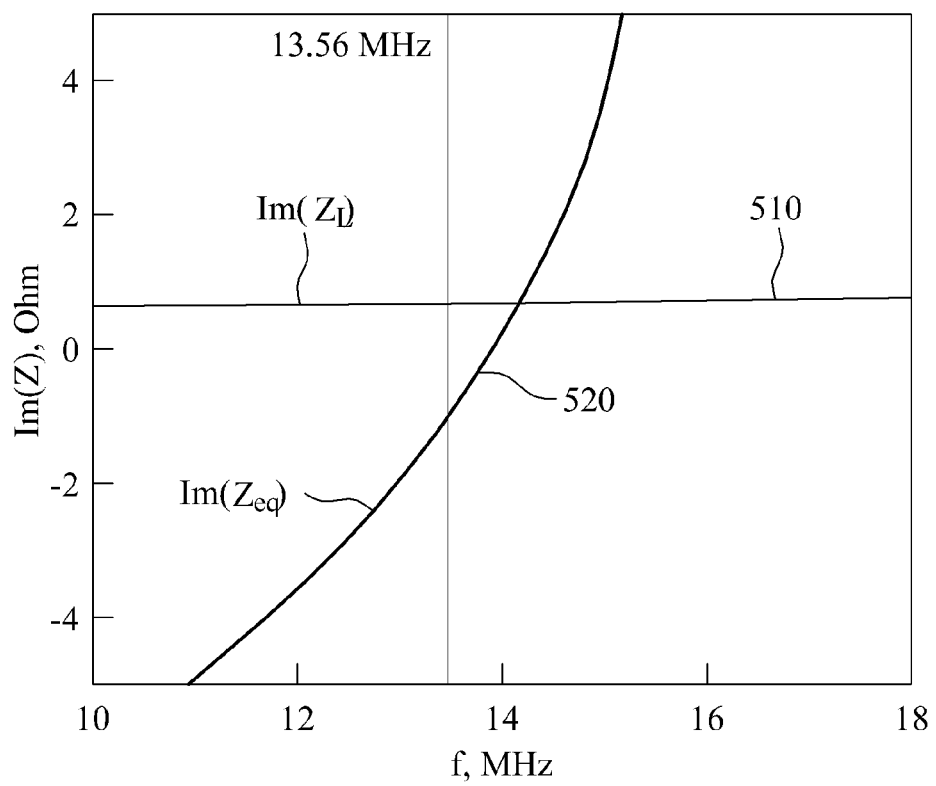
FIG. 5 is a graph illustrating an example of a frequency dependence of an imaginary portion of an impedance of a conducting loop, and a frequency dependence of an imaginary portion of an equivalent input impedance of a metacapacitor in a resonant apparatus for wireless power transmission.

FIG. 5 illustrates an example of a graph of frequency dependence of an imaginary portion 510 of an impedance of a conducting loop, and a frequency dependence of an imaginary portion 520 of an equivalent input impedance of a metacapacitor in a resonant apparatus for wireless power transmission.

Referring to FIG. 5, a high capacitance of the metacapacitor combined with a low inductance of the conducting loop may provide a resonant response of a suggested resonant structure at a preset operating frequency. The operating frequency may correspond to a zero-reactive portion of the input impedance of the resonant structure including the conductive loop and the metacapacitor. For example, the suggested resonant structure may be implemented by a thin film technology.

For example, the resonant structure described herein may be implemented in a circular form or a polygonal form including a predetermined number of faces. For example, the resonant structure may be used for portable wireless chargers for various electronic devices including small devices. For example, the resonant structure may be used for a charger for a mobile phone. As another example, in medical fields, the resonant structure may be used for cardio stimulators, pacemakers, or other electronic devices including compact devices.

The resonant structure may be configured in a compact size, and may have a high Q-factor while being operated at a frequency ranging from, for example, 1 MHz to 100 MHz.

A characteristic of the resonant structure may be represented by a bulk acoustic resonator used in a capacitor mode having a high nominal value. Such a bulk acoustic capacitor may be referred to as a metacapacitor.

An operational principle of the metacapacitor may be based on an interaction between wave processes, differing from natural physical phenomena, for example, three-dimensional (3D) acoustic waves and electromagnetic waves.

An artificially generated interaction of the processes differing from the natural phenomena may be classified as a "metamaterial phenomenon."

The resonant structure may be used in a semiconductor integrated circuit capable of being connected to an information transmission system, for example, local area network (LAN), wireless local area network (WLAN), Bluetooth, and the like.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonant apparatus for wireless power transmission, the resonant apparatus comprising:
   a conducting loop;
   two dielectric layers of which central portions are etched; and
   a capacitor comprising a metacapacitor, the metacapacitor comprising two metal electrodes and a piezoelectric layer disposed between the two metal electrodes,
   wherein the metacapacitor is disposed on a lower dielectric layer of the two dielectric layers,
   wherein an upper dielectric layer of the two dielectric layers is disposed on an upper electrode of the two metal electrodes, and
   wherein the conducting loop is disposed on the upper layer of the two dielectric layers.

2. The resonant apparatus of claim 1, wherein the conducting loop comprises a planar conductor that has a thickness that is less than a width of the planar conductor.

3. The resonant apparatus of claim 1, wherein the conducting loop comprises a shape of a circle.

4. The resonant apparatus of claim 1, wherein the central portions of the dielectric layers are etched to provide a free space for acoustic oscillation of a resonator membrane.

5. The resonant apparatus of claim 1, wherein a thickness of the upper dielectric layer is determined to reduce an impact of a parasitic capacitance between the conducting loop and the upper electrode of the metacapacitor.

6. The resonant apparatus of claim 1, wherein a thickness of the lower dielectric layer of the two dielectric layers is determined to ensure a mechanical strength of the resonant apparatus.

7. The resonant apparatus of claim 1, wherein the conducting loop is connected to the two metal electrodes of the metacapacitor by metalized via holes or external connectors.

8. The resonant apparatus of claim 1, wherein the piezoelectric layer of the metacapacitor comprises a ceramic material having a piezoelectric effect.

9. The resonant apparatus of claim 1, wherein the piezoelectric layer of the metacapacitor comprises plumbum titanate-zirconate ($Pb(Zr_xTi_{1-x})O_3$ (PZT)).

10. The resonant apparatus of claim 1, wherein the piezoelectric layer of the metacapacitor comprises a monocrystalline material having an electromechanical coupling coefficient above a threshold, a quality factor (Q-factor) above a second threshold, and a dielectric loss below a third threshold.

11. The resonant apparatus of claim 1, wherein a structure of the resonant apparatus comprises a planar multilayer structure made by a thin film technology.

12. The resonant apparatus of claim 1, wherein a structure of the resonant apparatus comprises a circular structure or a polygonal structure.

13. The resonant apparatus of claim 1, wherein a diameter of the resonant apparatus is smaller than a hundredth of a wavelength.

14. The resonant apparatus of claim 1, wherein thicknesses of the two dielectric layers are determined to be thicknesses by which an acoustic oscillation of a shear wave resonates at a frequency exceeding a system operating frequency.

15. The resonant apparatus of claim 1, wherein the metacapacitor is operated as an acoustic resonator, and an external impedance at a system operating frequency of the acoustic resonator is equivalent to an impedance of a capacitor having a capacitance value above a threshold.

16. The resonant apparatus of claim 1, wherein a capacitance value of the metacapacitor is determined to ensure a resonant response of the resonant apparatus at a selected system operating frequency, in combination with an inductance of the conducting loop.

17. The resonant apparatus of claim 1, wherein the piezoelectric layer and the lower dielectric layer of dielectric layers are separately disposed by a lower electrode of the two metal electrodes, and the piezoelectric layer and the upper dielectric layer of dielectric layers are separately disposed by the upper electrode of the two metal electrodes.

18. A wireless power transmission device, comprising:
   a metacapacitor comprising an upper electrode layer, an lower electrode layer and a piezoelectric layer that is disposed between the upper electrode layer and the lower electrode layer;
   two dielectric layers of which central portions are etched, wherein the metacapacitor is disposed on a lower dielectric layer of the two dielectric layers, and wherein an upper dielectric layer of the two dielectric layers is disposed on the upper electrode layer; and
   a conducting loop layer disposed on the upper dielectric layer of the two dielectric layers,
   wherein the wireless power transmission device is configured to transfer and/or receive power wirelessly through magnetic coupling.

19. The wireless power transmission device of claim 18, wherein the conducting loop is connected to the upper electrode layer and the lower electrode layer of the metacapacitor by metalized holes.

20. The wireless power transmission device of claim 18, wherein the piezoelectric layer and the lower dielectric layer of dielectric layers are separately disposed by the lower electrode layer, and the piezoelectric layer and the upper dielectric layer of dielectric layers are separately disposed by the upper electrode layer.

* * * * *